US012369563B2

(12) United States Patent
Van Der Kamp et al.

(10) Patent No.: US 12,369,563 B2
(45) Date of Patent: Jul. 29, 2025

(54) METHOD FOR MANAGING A HERD, AND MILKING DEVICE FOR PERFORMING THE METHOD

(71) Applicant: LELY PATENT N.V., Maassluis (NL)

(72) Inventors: Adolf Jan Van Der Kamp, Kampen (NL); Pieter Neelus Kool, Berkenwoude (NL)

(73) Assignee: LELY PATENT N.V., Maassluis (NL)

( * ) Notice: Subject to any disclaimer, the term of this patent is extended or adjusted under 35 U.S.C. 154(b) by 78 days.

(21) Appl. No.: 18/245,748

(22) PCT Filed: Sep. 28, 2021

(86) PCT No.: PCT/IB2021/058838
§ 371 (c)(1),
(2) Date: Mar. 17, 2023

(87) PCT Pub. No.: WO2022/074509
PCT Pub. Date: Apr. 14, 2022

(65) Prior Publication Data
US 2023/0354772 A1    Nov. 9, 2023

(30) Foreign Application Priority Data

Oct. 5, 2020   (EP) ..................................... 20020457
Oct. 6, 2020   (NL) ..................................... 1043809

(51) Int. Cl.
*A01K 1/12*    (2006.01)
*A01K 29/00*   (2006.01)
*A01J 5/007*   (2006.01)

(52) U.S. Cl.
CPC .............. *A01K 1/12* (2013.01); *A01K 29/005* (2013.01); *A01J 5/007* (2013.01)

(58) Field of Classification Search
CPC .......... A01K 1/12; A01K 29/005; A01J 5/007
See application file for complete search history.

(56) References Cited

U.S. PATENT DOCUMENTS

| 5,152,246 A * | 10/1992 | Wakui ..................... | A01J 5/007 |
| | | | 119/14.15 |
| 2007/0044732 A1* | 3/2007 | Araki ..................... | A01K 29/00 |
| | | | 119/721 |
| 2010/0228532 A1* | 9/2010 | Abdel-Azim ........... | A01J 5/007 |
| | | | 703/2 |

FOREIGN PATENT DOCUMENTS

EP         0657098 A1 *   6/1995
WO    WO 2008/041839 A1   4/2008
(Continued)

OTHER PUBLICATIONS

Jianliang, W. et al., "Comparison of Different Selection Methods for Chinese Holstein Cows," Zhejiang Agricultural Science, Issue 2, 2011, pp. 420-422 (submitting English machine translation only).

(Continued)

*Primary Examiner* — Christopher D Hutchens
(74) *Attorney, Agent, or Firm* — Oblon, McClelland, Maier & Neustadt, L.L.P.

(57)    ABSTRACT

A method for milking and managing a herd of dairy animals by at least attributing an insemination suitability status, the method includes, for each dairy animal, milking the dairy animal by means of a milking device, with a controller. By means of the controller, using a measuring device, determining at least one parameter value $PV_i$ related to the milking. By means of the controller, calculating an index value V of the dairy animal with respect to the herd of dairy animals on the basis of $PV_i$ and an average parameter value $PV_{hi}$ for the herd of dairy animals, which index value V indicates a value ranking order in the herd, and if the index value of the dairy animal fulfils a predefined criterion, automatically by means of the controller attributing to the dairy animal the insemination suitability status "inseminate no longer".

21 Claims, 2 Drawing Sheets

(56) References Cited

FOREIGN PATENT DOCUMENTS

Figure 1:
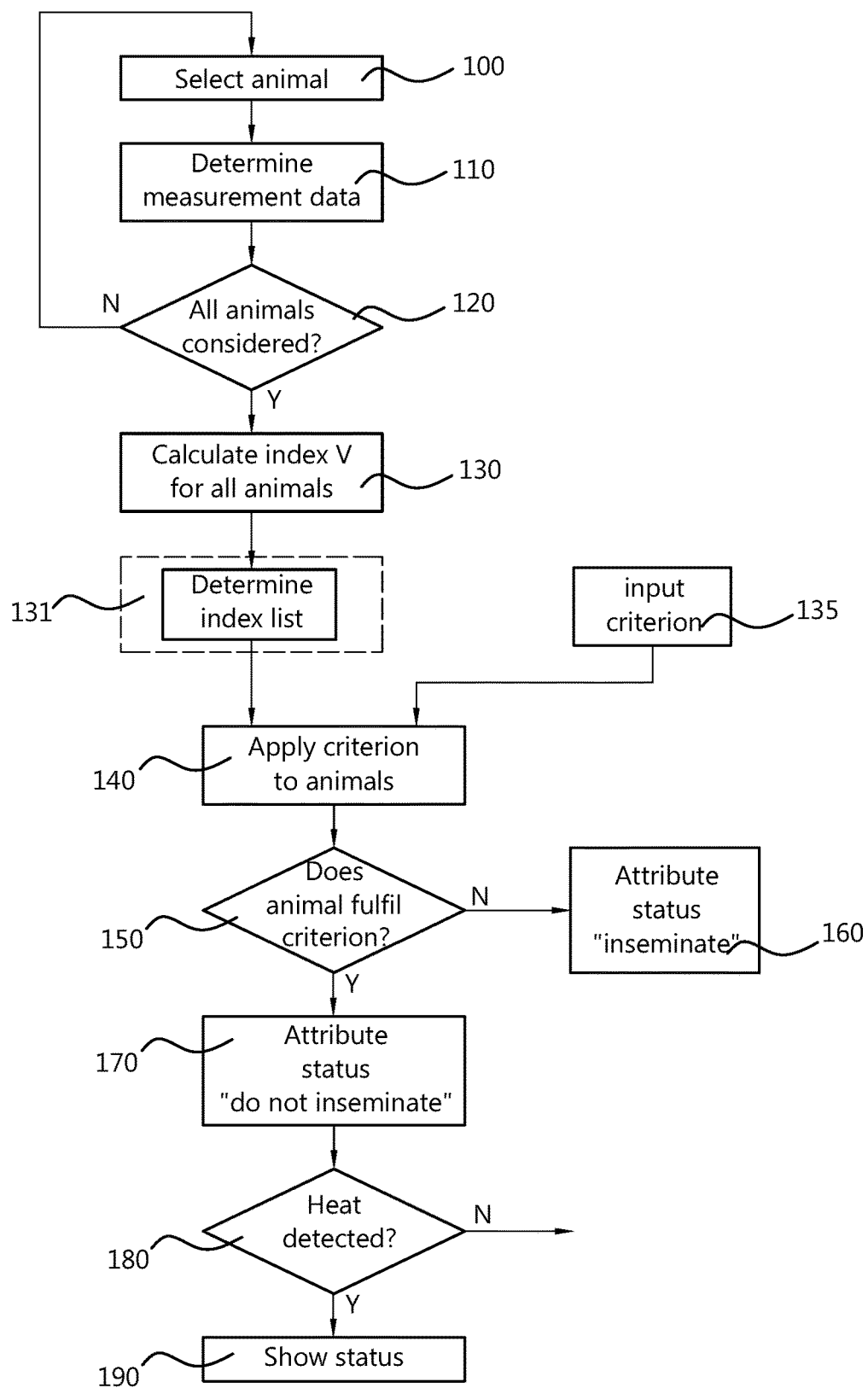

| WO | WO 2012/078054 A1 | 6/2012 |
| WO | WO 2018/111179 A1 | 6/2018 |
| WO | WO 2018/212707 A1 | 11/2018 |

OTHER PUBLICATIONS

International Search Report issued Dec. 22, 2021 in PCT/IB2021/058838, filed on Sep. 28, 2021, 3 pages.
Firk R et al., "Automation of oestrus detection in dairy cows: a review", Livestock Production Science, vol. 75, 2002, pp. 219-232.

* cited by examiner

```
Animal 1  :  V = 110
Animal 2  :  V = 109
Animal 3  :  V = 109
Animal 4  :  V = 108
           .
           .
           .
Animal 44 :  V = 98
────────────────────
Animal 45 :  V = 97
           .
25%        .
           .
Animal 59 :  V = 87
Animal 60 :  V = 84
```

METHOD FOR MANAGING A HERD, AND MILKING DEVICE FOR PERFORMING THE METHOD

CROSS REFERENCE TO RELATED APPLICATIONS

This application is a National Stage entry under 35 U.S.C. § 371 of PCT/IB2021/058838, filed on Sep. 28, 2021, and claims priority to Netherlands Patent Application No. 1043809, filed on Oct. 6, 2020 and European Patent Application 20020457.6, filed on Oct. 5, 2020. The entire contents of each are incorporated herein by reference.

In a first aspect, the invention concerns a method for milking and managing a herd of dairy animals.

As is known, dairy animals such as cows, goats and buffalo are used by humans to produce milk. For the production of milk during lactation, it is necessary for animal to bear young, and for this the dairy animal must first be inseminated. In order to maintain an economically beneficial cycle, it is usual for a dairy animal to be inseminated again early in the lactation period. For each dairy animal, there comes a moment at which it is no longer appropriate to re-inseminate the animal.

For the manager of the herd, it is difficult to determine whether a dairy animal must be re-inseminated. Usually, one and the same end-of-lifetime is applied to each dairy animal, or other reasons than economic ones play a role. In particular for larger herds of for example hundreds of dairy animals, it is almost impossible for a manager to determine a suitable insemination suitability status for the dairy animals on rational grounds. But even in small herds, for example emotional reasons may take priority, or reasons that are given an unduly heavy weight due to their having occurred recently, such as sickness towards the end of the lactation. Both hinder optimal management of the herd.

It is an object of the invention to provide a method for managing a herd of dairy animals, with which an insemination suitability status of a dairy animal can be determined automatically on more rational grounds.

For this, the invention provides a method as claimed in claim 1, in particular a method for milking and managing a herd of dairy animals with at least attributing an insemination suitability status which indicates the suitability for insemination of a dairy animal, the method comprising, for each dairy animal: milking the dairy animal by means of a milking device, in particular a robot milking device having a controller; by means of the controller, using a measuring device, determining at least one parameter value $PV_i$ related to the milking; and by means of the controller, calculating an index value V of the dairy animal with respect to the herd of dairy animals, on the basis of $PV_i$ and an average parameter value $PV_{ha}$ for the herd of dairy animals, which index value V indicates a value ranking order in the herd; and if the index value of the dairy animal fulfils a predefined criterion, automatically by means of the controller attributing to the dairy animal the insemination suitability status "inseminate no longer"; wherein the controller calculates the index value V on the basis of $PV_i$ and $PV_{ha}$, in particular as the ratio of $PV_i$ and $PV_{ha}$; wherein the predefined criterion comprises either that said dairy animal belongs to a predefined part of the herd with the least favorable, in particular the lowest index value, or that said index value of the dairy animal deviates from the herd average index value $V_h$ in the unfavorable sense by a predefined measure, in particular by a number of standard deviations of the distribution of index values of the herd.

The invention is based on the insight that having measurable criteria provides clarity and an economically sensible management, wherein for example emotions do not play a role. The decision to not inseminate an animal is taken automatically, or in any case the advice for this is given. A manager is free to ignore the advice or insemination suitability status, but it is important that the manager in any case knows what is economically best for the herd management. In addition, the risk that a dairy animal will be inseminated without an economic consideration forming the basis for this, is limited. The controller always determines for each dairy animal whether such an insemination is economically desirable. The controller measures at least one parameter and compares the (economic) value of this parameter for the dairy animal with the corresponding parameter value of the herd average, and thus determines a ranking of the dairy animal in the herd. If the dairy animal with this ranking fulfils a criterion, the dairy animal is awarded the status "inseminate no longer"; otherwise, the advice is "inseminate".

The index value indicates a place in the economic ranking which is determined on the basis of the parameter value(s) measured by the controller. Thus the index value is neutral and not influenced by undesired factors, and can also be determined at any moment, such as when the dairy animal should be able to be inseminated. This means that management of the herd can automatically be made more economic, and the manager's time and effort can be saved.

The index value is determined on the basis of the parameter value $PV_i$ and the associated herd average $PV_{ha}$. The determination is not specifically restricted and is for example the ratio $PV_i/PV_{ha}$ as the simplest example. The index value is then standardized to 1, or expressed as a percentage, 100%. It is not however excluded to calculate the index value in another way, such as first reducing or increasing the parameter value by a fixed number and then determining the ratio with a corresponding herd average. Or dividing the difference from the herd average by the herd average, which corresponds to reducing the previously mentioned ratio by 1, etc.

The predetermined part may here concern an absolute number of animals or for example a relative part or percentage of the herd. The average Dutch milking cow will live 5.7 years and gives milk from around the age of 2. Thus the manager is for example able to choose to remove 25% of the herd per year. It must be noted that dairy animals may also be removed for other reasons, such as because of sickness, accident etc. In by far the most cases, the present lactation is completed before the dairy animal is removed from the herd. Therefore it is also possible to calculate the percentage or the absolute number back to a shorter period, such as 2% per month.

Alternatively, it is possible to award a dairy animal the status "inseminate no longer" if the index value deviates from a herd average index value in the unfavorable sense by at least a predefined measure. For example, a dairy animal is awarded the status "inseminate no longer" if the index value is at most 80% of the average, if said index value is calculated as the ratio between the parameter value and the herd average, or if the index value deviates from the herd average in the unfavorable sense by at least two or another number of times the standard deviation. The latter takes account of the circumstance that for some parameter values, a value as low as possible is favorable, so that an upward deviation is unfavorable. The concept of standard deviation relates to a statistical distribution of the parameter and index values, wherein for a normal distribution, a deviation of 1 standard deviation occurs in approximately 32% of the animals, and in the unfavorable sense approximately 16%, and 2 standard deviations on average occur in 4% of the population, and in the unfavorable sense approximately 2%. It may be suitable, in greatly deviating cases, to award this dairy animal the status "inseminate no longer" irrespective of the further desired number of dairy animals no longer to be inseminated.

Particular embodiments are described in the dependent claims and in the following part of the description.

In some embodiments, the method furthermore comprises, if the index value of the dairy animal fulfils a predefined criterion, attributing to the dairy animal the supplementary status "after completion of the momentary lactation, remove from the herd", and removing from the herd after the end of lactation. The consequence of no longer inseminating is always that the dairy animal concerned will no longer become pregnant, and hence not begin a new lactation, and thus economically no longer be profitable. The dairy animal should then be removed from the herd of dairy animals after the end of lactation. Removal may for example take place to an abattoir, to a fattening company etc. The definitive removal may be supported by the controller by configuring the latter to separate the dairy animal at the moment of the end of lactation, or give the manager a corresponding signal.

In some embodiments, the method furthermore comprises monitoring the dairy animal in order to detect heat, and if it is detected that the dairy animal displays heat, making the insemination suitability status of the dairy animal knowable in an attention list or to the manager. In (very) large herds, if the decision has already been taken to not inseminate a dairy animal, it may be decided to keep this dairy animal in a separate part of the herd in which heat is no longer monitored. If the dairy animal is kept in the existing herd and heat is monitored in each dairy animal, it is also desirable, when heat is detected, to make the manager aware that the dairy animal concerned should no longer be inseminated by announcing the insemination suitability status "inseminate no longer", for example by means of a signal, a (sms or push) message, inclusion on an attention list, a message on a computer screen etc. Heat may be detected in any known fashion, such as activity measurement, jump or stand detection, with a bull etc.

In suitable embodiments, the method comprises that if the at least one parameter value comprises a first parameter value $PV_1$ up to and including an n—the parameter value $PV_n$, the index value for the dairy animal is determined by determining for the parameter value j a sub-index value $V_{i\text{-}sub,j}$, and determining the index value $V_i$ for the dairy animal on the basis of all sub-index values. The use of more than one parameter value may further increase the credibility of the advice, since more factors can be included in the attribution of the insemination suitability status. The sub-index values may each be determined in one of the ways already described, such as dividing by the herd average etc. The total index value for the dairy animal may be calculated in any way from the determine sub-index values, for example by incrementation. In particular, the index value is calculated as a weighted mean index value according to $V = (\Sigma a_j V_{i\text{-}sub,j})/\Sigma a_j$ for all parameters j, wherein $a_j$ are predefined constants. The value of $a_j$ may here be a relative value which the manager attributes to the sub-index. The values may differ per dairy animal or per group of dairy animals. In the simplest case, all values $a_j$ are equal. The values $a_j$ may be entered in the controller in advance, such as in the factory, but it is also possible for a herd manager to enter the values during management by means of a data input device provided and configured for this purpose.

In some exemplary embodiments, said at least one parameter value comprises an expected total production TMP of at least one constituent of the milk of the dairy animal in a lactation following said insemination. The production, expressed in the quantity of the constituent concerned, is of course an important parameter for dairy animals. The production relevant for the insemination decision is not that of the present lactation but that of the following lactation, so that in all cases this is an expectation value.

The expectation value may be calculated in many ways. In some embodiments, said expected total production is equated to the total production during the most recent complete lactation. This is the simplest way of calculating the expected production. A lactation is considered "complete" if it is not interrupted for a particular reason such as sickness.

In particular, said expected total production is calculated on the basis of historic production data of the dairy animal and/or historic production data of the herd of dairy animals and/or a model. Thus the development of the dairy animal can be observed better. For example, the historic data may include production data of the dairy animal in all earlier lactations which have been completed, and where applicable in the present current lactation. Thus by comparing the first production data of the present lactation with that of earlier lactations, it can be calculated whether and how the production data of the next following lactation is expected to change. Alternatively or additionally, the production data of comparable dairy animals may be considered in order to be able to calculate the expectation value for the future lactation more precisely. Also, a model may be used, for example for a herd with a great deal of unknown data, such as a new herd.

Besides production data, it is also possible to include data concerning the growth of the dairy animal, the feed consumption etc. in the calculation of the expectation value. The controller in this case is configured accordingly, either for input of the corresponding data or for a connection to a suitable measuring device.

In some embodiments, said at least one milk constituent comprises milk fat or milk protein of the milk, or the whole milk. The relevant values for milk production are usually the total production and the production of milk fat and milk protein. Nonetheless, it is also possible to select one or more other constituents such as lactose, a desired protein composition such as A2 milk, or even production of a special protein obtained by genetic manipulation.

In some embodiments, said part of the herd of dairy animals is the part with a same parity class as said dairy animal. In particular, a first parity class contains the dairy animals with one complete lactation, and a second parity class contains the dairy animals with two or more complete lactations. Since many dairy animals undergo great changes around the first lactation, such as further growth, it is sensible to divide the herd at least into first parity animals and higher parity animals. In large herds, it may even be suitable to choose a further subdivision.

In some embodiments, said at least one parameter value comprises the total time TT during said most recent lactation that the dairy animal spent in the milking device. This time leads to a proportion of the depreciation and other costs of the milking device, and a relatively long duration TT accounts for a relatively high proportion. This parameter is relevant in particular if the milking device is a robot milking device. Not only are these milking devices often more costly than conventional milking devices, so that a longer occupation time has more impact on the proportion of the costs, but the occupation time may also vary more than in conventional milking devices. This is associated with the circumstance that in robot milking devices, the teats must be found and the milking cups must be connected by means of a teat detection system and a robot arm. This is less efficient than if done by a person, namely if one or more teats cannot be found and connected at the first attempt. A dairy animal for which the latter is the case, is indicated as "less robot-suitable" and thus leads to higher costs.

Alternatively or additionally, said at least one parameter value comprises the reproduction result RR of said dairy animal, wherein RR is calculated on the basis of the number of inseminations #I required for the one or more previous conceptions, and/or a length of the waiting period DWP. The number of inseminations necessary to ensure conception in the dairy animal is an important element for the herd manager with respect to work and costs, and thus should preferably also be taken into account in the consideration of whether or not to inseminate. The number of inseminations may be selected as the number of inseminations for the previous pregnancy or for all pregnancies of the dairy animal. The waiting period concerns in particular the time to successful insemination/conception, namely between calving and successful insemination. The longer this time, the longer the dairy animal must be dried off in the current lactation, which leads to a greater proportion of lactation days with a lower milk production. The waiting period may be expressed in various ways, such as for example a number, such as the duration in days divided by average cycle time (21 days for dairy cows).

The advantage of the invention is particularly evident in assessment of this aspect. Thus it is possible that a cow or another dairy animal does not clearly show heat, so that often one or more heat moments are missed, and the waiting time DWP for this dairy animal is relatively long. If nonetheless milk production only falls off slowly during lactation, it may be a dairy animal that has a more suitable feed conversion, milk production etc. than a dairy animal with a clear heat which invariably becomes pregnant in one insemination, but however has a milk production which falls off relatively quickly. By the controller calculating both factors, a better decision can be made concerning the insemination suitability status.

It should also be noted here that not only the total production during a lactation is relevant for the decision, but also the production during a later part of the lactation such as when the dairy animal only later becomes pregnant. Thus a separate parameter value may be the (daily or total) production of one or more milk constituents in a predefined part of the lactation of the dairy animal.

Alternatively or additionally, said at least one parameter value comprises a health number which is determined on the basis of the number and/or costs of the health treatments registered for said dairy animal, and/or on the basis of the number of health attentions. Here, a larger number of health treatments such as against mastitis, ketosis etc. leads to more work for the manager and more costs etc. By storing in the controller the number and/or costs of treatments and/or the number of health attentions—which also take time—for the dairy animal, and processing these into a (sub-)index value, again herd management can be improved.

Alternatively or additionally, said at least one parameter value comprises a profit number which is calculated on the basis of at least the milk yield of said dairy animal less the cost of feed and/or health treatments and/or inseminations concerning said dairy animal. Instead of or in addition to the above-mentioned parameter value(s), and in particular production, one parameter value may also be the profit as a number. A high production for even higher costs is economically pointless. Here the invention can help by automatically combining the relevant values into a relevant outcome. The costs for feed may for example be estimated on the basis of the feed allowance, being the quantity of concentrate that the dairy animal is given per day or lactation, or which is consumed by the animal. Other ways are not excluded, such as a refinement in which the quantity of roughage eaten is taken into account. The same applies also to costs for feed supplements and similar. Health and insemination costs have already been mentioned above. Other costs such as accommodation costs may also be taken into account as a fixed amount in a reduction to the profit.

In suitable embodiments, the profit number is partly calculated on the basis of the occupation time TT of the milking device by the dairy animal. In particular, the profit number as calculated above is divided by the occupation time TT. In this way, for each dairy animal it is clear how much profit may be achieved per occupation time in the milking device. In particular, this number may indicate a clear ranking in the dairy animals of the herd, on the basis of which the controller can decide to attribute a specific insemination suitability status on the basis of measured values.

In a second aspect, the invention provides a milking device for milking and managing a herd dairy animals, which milking device is configured for performing a method according to the first aspect of the invention, and which comprises milking means with milking cups; at least one measuring device for determining at least one parameter value $PV_i$ related to the milking; and a controller operably connected to the milking means and the measuring device; wherein the controller is configured, for each dairy animal, to store the parameter values $PV_i$ and to attribute and output, by means of an output device, an insemination suitability status.

The advantages of this milking device are largely as described above for the method, so are not repeated unnecessarily.

The milking device is in particular a robot milking device, since this is on average more costly than a conventional milking device, the occupation time varies more than in a conventional milking device, and an insemination decision may thus have more extensive consequences.

The output device may be configured for displaying a message on an attention list, for showing the status on a screen, such as a computer or telephone screen.

In some embodiments, the at least one measuring device is selected from the group of a milk quantity meter for measuring a quantity of extracted milk, a milk fat content meter for measuring a milk fat content of the extracted milk, a milk protein content meter for measuring a milk protein content of the extracted milk, a clock for determining a time during which a dairy animal occupied the milking device, a feed meter for determining the quantity of feed eaten by the dairy animal, in particular a concentrate meter, and a memory for input by a manager of data concerning a health treatment, insemination and/or conception of the dairy animal. It is noted here that such meters, apart perhaps from the fat/protein meters, are generally provided on milking devices. The invention however uses the measurement values in a suitable manner for making a decision and giving advice in the form of attribution of an insemination suitability status. Thus a more neutral, time-saving and data-based decision step is carried out by the controller.

In particular, the milking device also comprises a heat detection device which is configured for detecting heat in dairy animals, and the controller is connected to the heat detection device and configured for presenting the calculated insemination suitability status when the heat detection device detects heat.

Figures 2, 3:
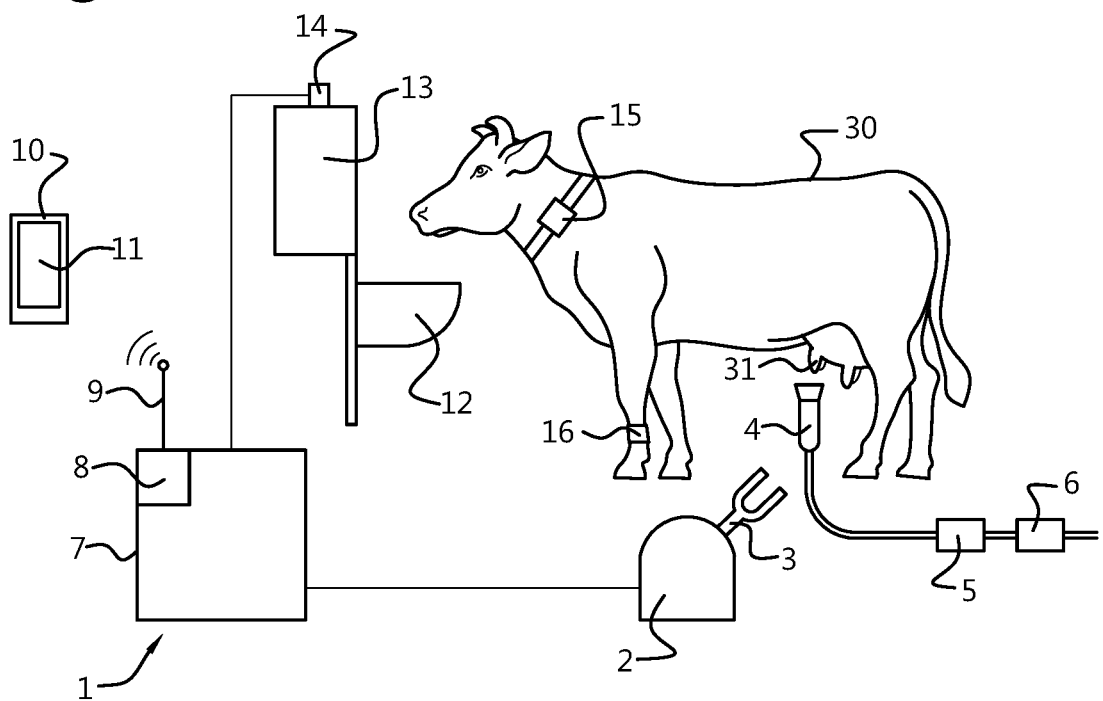

The invention will now be explained in more detail with reference to a non-limitative example, and it shows in:

FIG. 1 a schematic flow diagram of a method according to the invention,

FIG. 2 an example of a list of index values, and

FIG. 3 a milking device according to the invention.

FIG. 1 shows a schematic flow diagram of a method according to the invention. The method begins with steps 100, 110 and 120 for collecting the necessary measuring data for each animal, such as production quantities, occupation times TT of the milking device, and/or health costs. The choice of measurement data depends on the herd manager and the availability of this data.

Then for all dairy animals, the index value $V_i$ is calculated in step 130. As an example, first a herd average value for the respective measurement data is calculated, such as the total milk production TMP per dairy animal, which is a measure of the expected milk production in the lactation which will follow a successful subsequent insemination. By then dividing the individually expected total milk production value $TMP_i$ by the herd average $TMP_{ha}$, an index value $V_i$ is obtained for each dairy animal.

If required, in the optional step 131, an index list may be determined in which all individual index values $V_i$ are given in sequence from favorable to unfavorable (or vice versa, naturally).

Step 135 indicates the input of a criterion which is applied to the index value to decide whether a dairy animal should have the insemination suitability status "inseminate no longer" or "inseminate". This criterion concerns an input by the manager or factory or similar. For example, the criterion is "attribute the status 'inseminate no longer' to all animals in the least favorable 25% of index values".

In step 140, the criterion is applied to a dairy animal, and if in step 150 the dairy animal fulfils the criterion, then in step 170 the insemination suitability status "inseminate no longer" is attributed by the controller, otherwise in step 160 the status "inseminate".

If, in step 180, heat is detected in the dairy animal, then in step 190 the status is displayed to the manager, such as in a message on the screen of his computer, with a visible signal or similar.

FIG. 2 shows an example of a list of index values. The list is standardized to an average of 100 and the herd size is 60 animals. As a criterion, it is determined that each year 25% of the animals should be removed from the herd, i.e. 15 animals. In this example, the assumption is 0% removal for sickness or other reasons. Of course, such animals should be deducted from the 25% unless there are special reasons for yet removing an animal.

The list is ordered by falling index value V. Here, V is for example a production of milk, milk fat or milk protein. In the case for example that the costs for feed and/or health treatments and/or insemination values are used as a parameter value for calculating V, a list with an incremental order would be headed by the most economically favorable animal.

A division has been made at the line. Animals with an index value in the top 75% are inseminated, or in any case awarded a corresponding status, while the bottom 25% (15 animals) are awarded the status "inseminate no longer".

An addition or exception to this may be caused by a greatly deviating index value. If for example 16 or more animals have an index value which deviates from the mean by more than for example 1.5 standard deviations, then all these animals would get the status "inseminate no longer". The criterion is here replaced by "does the index value deviate from the mean in the negative sense by more than 1.5 standard deviations?". This number may, in the case of a sharp division, be greater than the basic setting "the poorest 25%". Other numbers are of course possible.

FIG. 3 shows a milking device 1 according to the invention. The milking device 1 is a robot milking device with a robot part 2 with a robot arm 3, a milking cup 4, a milk meter 5, a milk composition meter 6, and a controller 7 with a memory 8 and an antenna 9. Reference numeral 10 indicates a mobile telephone with a screen 11. Also, a feed trough 12 is provided, in which a feed provider 13 can provide feed. Reference numeral 14 indicates an animal identification device, wherein 15 indicates an animal ID tag and 16 a step counter. Finally, 30 indicates a dairy animal with teats 31.

The milking device 1 is here a milking robot known in itself, with a robot body 4 with for example a milk collection tank, a vacuum pump and similar, and with a robot arm 3 for attaching the milking cup(s) 4 to the teats 31 of the dairy animal 30 by means of a teat position determination device (not shown here). The milking device may also equally well comprise a conventional milking device, wherein a person attaches the milking cups to the teats.

The milking cup 4 extracts milk from the teat 31. The milk meter 5 measures the quantity of extracted milk, and the milk composition meter 6 measures the milk composition, in particular a fat and/or protein content of the milk. Incidentally, it is alternatively possible to determine the fat and/or protein content from laboratory data concerning individual milk samples. Also, a clock (not shown) built into the controller indicates the total time TT during which a dairy animal 30 has occupied the milking robot 1 during the processing. In addition, a feed trough 12 in the milking robot 1 provides concentrate to the dairy animal 30 by means of a feed provider 13. This provides feed on the basis of a feed allowance assigned to the dairy animal 30, which is determined by the controller after identification of the dairy animal by means of the animal ID tag 15, attached for example to a neck band around the neck of the dairy animal, and the animal identification device 14 such as a tag reader. The provided quantity of feed, or more precisely the consumed quantity of feed, is reported to the controller 7. If the feed provider can provide different types of feed, a quantity may be determined for each feed type. On the basis of the type and quantity, for example the associated costs can be determined by the controller.

The data received by the controller 7 is stored in a memory 8 and processed into an index value V for the dairy animal, partly on the basis of corresponding data for the other animals. This is explained for example with reference to FIGS. 1 and 2. The controller 7 thus contains a list of index values V. On the basis of a criterion stored in the controller, the controller may then determine whether a dairy animal should be awarded the insemination suitability status "inseminate no longer" or "inseminate".

This status may be displayed on request. But also, and above all if heat is detected for an animal, displaying this is important. For example, if on the basis of measurement data from the step counter 16 and in a known fashion, heat of a dairy animal 30 is detected, the status is displayed to the manager. For this, the controller 7 for example sends the status via a transmission antenna 9 to the user's mobile phone 10, where the status appears on the screen 11. The user/manager may take the status as a decision and not inseminate the dairy animal 30, or still inseminate it for special reasons.

The invention claimed is:

1. A method for milking and managing a herd of dairy animals by at least attributing an insemination suitability status which indicates a suitability for insemination of a dairy animal, the method comprising, for each dairy animal:
   milking the dairy animal by means of a milking device, with a controller,
   by means of the controller, using a measuring device, determining at least one parameter value $PV_i$ related to the milking,
   by means of the controller, calculating an index value V of the dairy animal with respect to the herd of dairy animals on the basis of $PV_i$ and an average parameter value $PV_{ha}$ for the herd of dairy animals, which index value V indicates a value ranking order in the herd, and
   if the index value of the dairy animal fulfils a predefined criterion, automatically by means of the controller attributing to the dairy animal the insemination suitability status "inseminate no longer",
   wherein the controller calculates the index value V based on $PV_i$ and $PV_{ha}$,
   wherein the predefined criterion comprises either that said dairy animal belongs to a predefined part of the herd with a lowest index value, or that said index value of the dairy animal deviates from a herd average index value $V_h$ by a predefined measure, and
   wherein said at least one parameter value comprises a profit number which is calculated on a basis of at least a milk yield of said dairy animal less a cost of feed and/or health treatments and/or inseminations concerning said dairy animal.

2. The method as claimed in claim 1, further comprising, if the index value of the dairy animal fulfils said predefined criterion, attributing to the dairy animal a supplementary status "after completion of the momentary lactation, remove from the herd", and removing from the herd after the end of lactation.

3. The method of claim 1, further comprising monitoring the dairy animal in order to detect heat, and if it is detected that the dairy animal displays heat, making the insemination suitability status of the dairy animal knowable in an attention list or to a manager.

4. The method of claim 1, wherein if the at least one parameter value comprises a first parameter value $PV_1$ up to and including a parameter value $PV_n$, the index value for the dairy animal is determined by determining for a parameter value j a sub-index value $V_{i-subj}$, and determining the index value V for the dairy animal on a basis of all sub-index values as a weighted mean index value according to $V=(\Sigma a_j V_{i-subj})/\Sigma a_j$ for all parameters j, wherein $a_j$ are predefined constants.

5. The method of claim 1, wherein said at least one parameter value comprises an expected total production TMP of at least one constituent of a milk of the dairy animal in a lactation following insemination.

6. The method of claim 5, wherein said expected total production is equated to a total production during a most recent complete lactation.

7. The method of claim 5, wherein said expected total production is calculated on a basis of historic production data of the dairy animal and/or historic production data of the herd of dairy animals and/or a model.

8. The method of claim 5, wherein said at least one constituent of the milk comprises milk fat or milk protein of the milk, or the whole milk.

9. The method of claim 5, wherein said part of the herd of dairy animals is a part with a same parity class as said dairy animal.

10. The method of claim 9, wherein a first parity class contains dairy animals with one complete lactation, and a second parity class contains dairy animals with two or more complete lactations.

11. The method of claim 1, wherein said at least one parameter value comprises a total time TT during a most recent lactation that the dairy animal spent in the milking device.

12. The method of claim 1, wherein said at least one parameter value comprises a reproduction result RR of said dairy animal, wherein RR is calculated on a basis of a number of inseminations #I required for one or more previous conceptions, and/or a length of a waiting period DWP.

13. The method of claim 1, wherein said at least one parameter value comprises a health number which is determined on a basis of a number and/or costs of health treatments registered for said dairy animal, and/or on a basis of a number of health attentions.

14. A milking device, for milking and managing the herd of dairy animals, configured for performing the method of claim 1, wherein the milking device comprises:
   a milking means with milking cups;
   at least one measuring device for determining at least one parameter value $PV_i$ related to the milking; and
   the controller operably connected to the milking means and the measuring device,
   wherein the controller is configured, for each dairy animal, to store the at least one parameter values $PV_i$, and to attribute and output, by means of an output device, the insemination suitability status.

15. The milking device of claim 14, wherein the at least one measuring device is selected from the group consisting of a milk quantity meter for measuring a quantity of extracted milk, a milk fat content meter for measuring a milk fat content of the extracted milk, a milk protein content meter for measuring a milk protein content of the extracted milk, a clock for determining a time during which a dairy animal occupied the milking device, a feed meter for determining a quantity of feed consumed by the dairy animal, and a memory for input by a manager of data concerning a health treatment, insemination and/or conception of the dairy animal.

16. The method of claim 1, wherein the milking device is a robot milking device.

17. The method of claim 1, wherein the controller calculates the index value V based on a ratio of $PV_i$ and $PV_{ha}$.

18. The method of claim 1, wherein said index value of the dairy animal deviates from the herd average index value Vn in the unfavorable sense by a number of standard deviations of a distribution of index values of the herd.

19. The method of claim 1, wherein said at least one parameter value comprises a profit number which is calculated on the basis of at least the milk yield of said dairy animal less the cost of feed and/or health treatments and/or inseminations concerning said dairy animal divided by an occupation time TT of the milking device.

20. A method for milking and managing a herd of dairy animals by at least attributing an insemination suitability status which indicates a suitability for insemination of a dairy animal, the method comprising, for each dairy animal:
- milking the dairy animal by means of a milking device, with a controller,
- by means of the controller, using a measuring device, determining at least one parameter value $PV_i$ related to the milking,
- by means of the controller, calculating an index value V of the dairy animal with respect to the herd of dairy animals on the basis of $PV_i$ and an average parameter value $PV_{ha}$ for the herd of dairy animals, which index value V indicates a value ranking order in the herd, and
- if the index value of the dairy animal fulfils a predefined criterion, automatically by means of the controller attributing to the dairy animal the insemination suitability status "inseminate no longer",
- wherein the controller calculates the index value V based on $PV_i$ and $PV_{ha}$,
- wherein the predefined criterion comprises either that said dairy animal belongs to a predefined part of the herd with a lowest index value, or that said index value of the dairy animal deviates from a herd average index value $V_h$ by a predefined measure, and
- wherein said at least one parameter value comprises an expected total production TMP of at least one constituent of a milk of the dairy animal in a lactation following insemination.

21. A method for milking and managing a herd of dairy animals by at least attributing an insemination suitability status which indicates a suitability for insemination of a dairy animal, the method comprising, for each dairy animal:
- milking the dairy animal by means of a milking device, with a controller,
- by means of the controller, using a measuring device, determining at least one parameter value $PV_i$ related to the milking,
- by means of the controller, calculating an index value V of the dairy animal with respect to the herd of dairy animals on the basis of $PV_i$ and an average parameter value $PV_{ha}$ for the herd of dairy animals, which index value V indicates a value ranking order in the herd, and
- if the index value of the dairy animal fulfils a predefined criterion, automatically by means of the controller attributing to the dairy animal the insemination suitability status "inseminate no longer",
- wherein the controller calculates the index value V based on $PV_i$ and $PV_{ha}$,
- wherein the predefined criterion comprises either that said dairy animal belongs to a predefined part of the herd with a lowest index value, or that said index value of the dairy animal deviates from the herd average index value $V_h$ by a predefined measure, and
- wherein said at least one parameter value comprises a reproduction result RR of said dairy animal, wherein RR is calculated on a basis of a number of inseminations #I required for one or more previous conceptions, and/or a length of a waiting period DWP.

* * * * *